United States Patent
Terblanche

(10) Patent No.: US 7,178,820 B2
(45) Date of Patent: Feb. 20, 2007

(54) FRONT SUSPENSION FOR A MOTORCYCLE

(75) Inventor: Pierre Terblanche, Bologna (IT)

(73) Assignee: Ducati Motor Holding S.p.A., Bologna (IT)

( * ) Notice: Subject to any disclaimer, the term of this patent is extended or adjusted under 35 U.S.C. 154(b) by 0 days.

(21) Appl. No.: 11/007,317

(22) Filed: Dec. 9, 2004

(65) Prior Publication Data
US 2005/0156401 A1 Jul. 21, 2005

(30) Foreign Application Priority Data
Dec. 16, 2003 (EP) .................... 03425803

(51) Int. Cl.
*B62K 21/02* (2006.01)
*B62K 21/08* (2006.01)

(52) U.S. Cl. .................................... 280/276
(58) Field of Classification Search ................ 280/276
See application file for complete search history.

(56) References Cited

U.S. PATENT DOCUMENTS 5,069,467 A * 12/1991 Claudio ................. 280/276
6,517,095 B1 * 2/2003 Lansac et al. ........... 280/276
2001/0019197 A1 * 9/2001 Ito et al. ................. 280/276
2004/0046354 A1 * 3/2004 Turner et al. ............ 280/276
2005/0023795 A1 * 2/2005 Czysz .................... 280/276

FOREIGN PATENT DOCUMENTS

| DE | 98 000 | 10/1897 |
|---|---|---|
| EP | 0 110 188 | 6/1984 |
| FR | 1 069 047 | 7/1954 |

* cited by examiner

*Primary Examiner*—Lesley D. Morris
*Assistant Examiner*—Marlon Arce-Diaz
(74) *Attorney, Agent, or Firm*—Young & Thompson

(57) ABSTRACT

A front suspension (1) for a motorcycle, includes a fork (2) with a headstock (8), a sliding unit (3) that slides on the fork (2) in a substantially vertical direction, the unit (3) in turn supporting the motorcycle wheel (4), and an elastic shock absorbing assembly (5) acting on the sliding unit (3). The assembly (5) is centrally mounted within the headstock (8) and is connected to the latter by a quick-release connection (9) so that the assembly (5) can be easily removed directly from the top or bottom of the headstock (8).

10 Claims, 5 Drawing Sheets

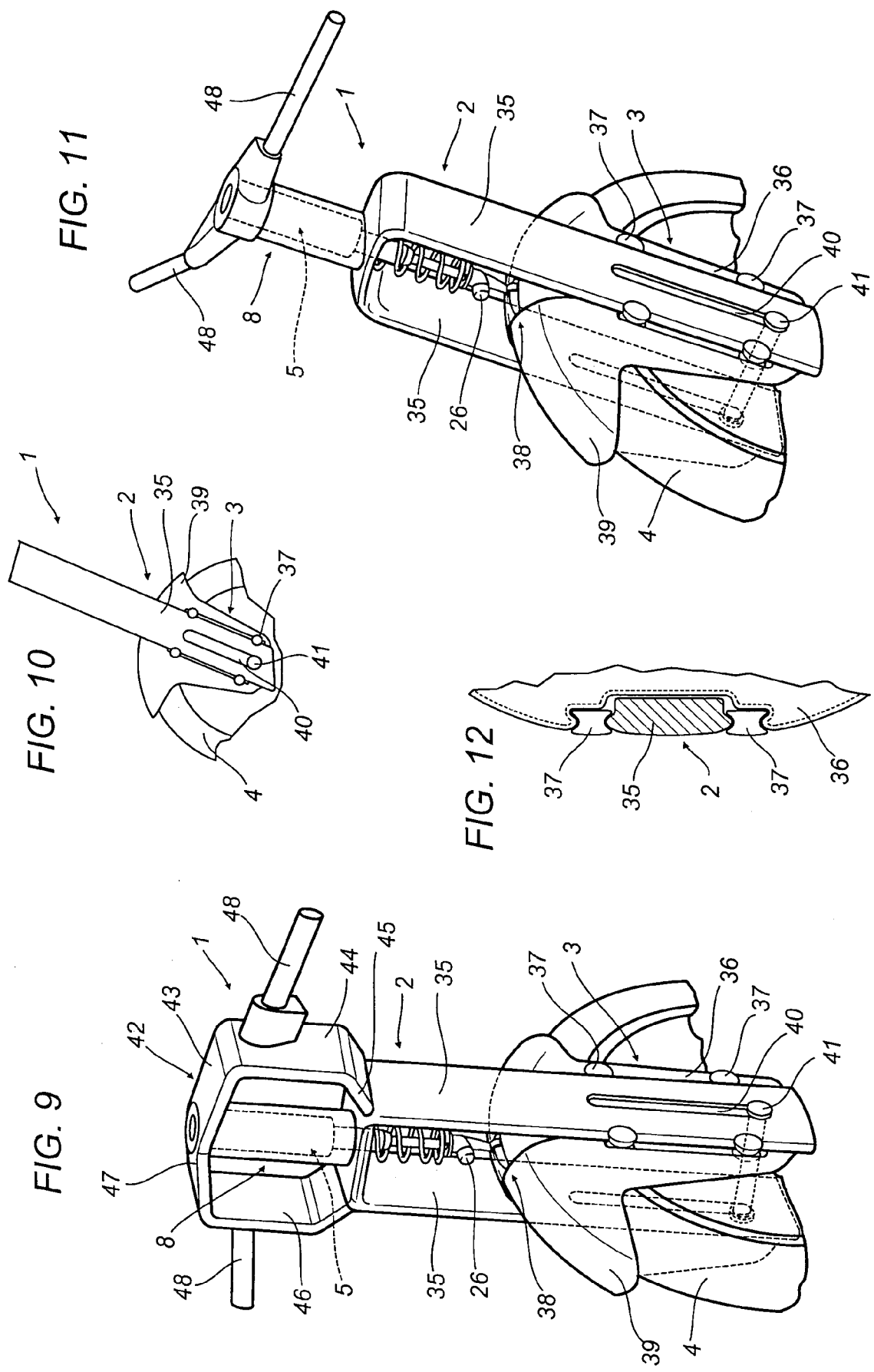

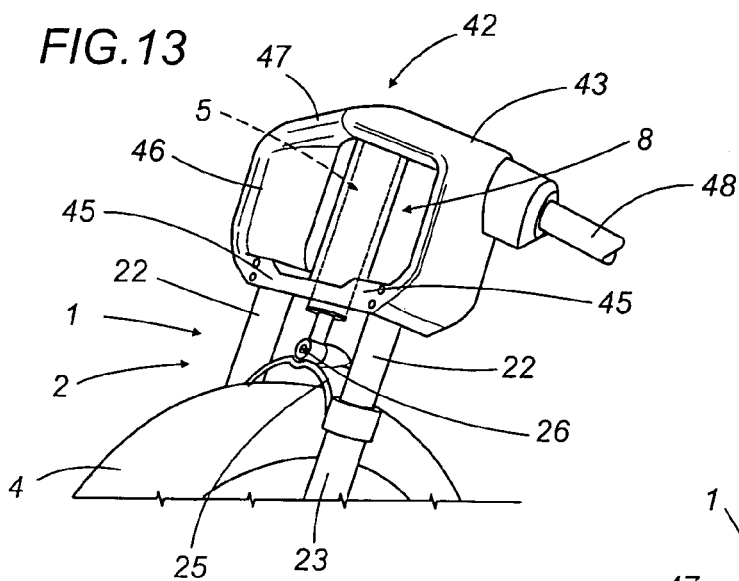
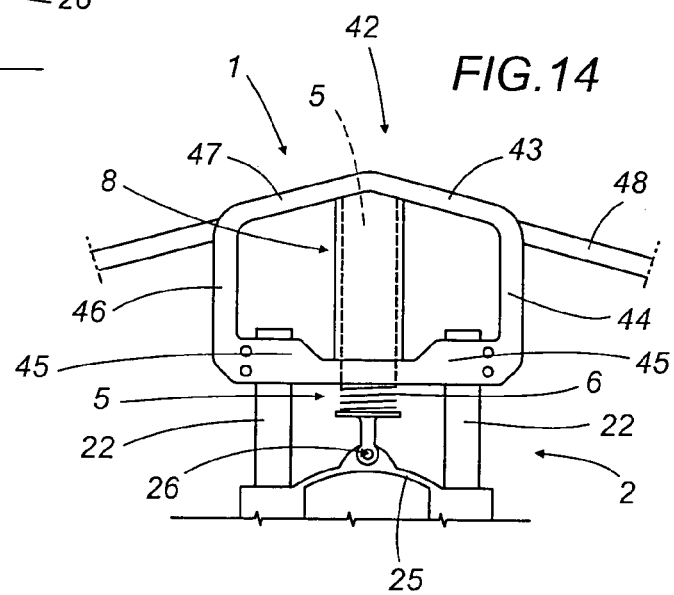
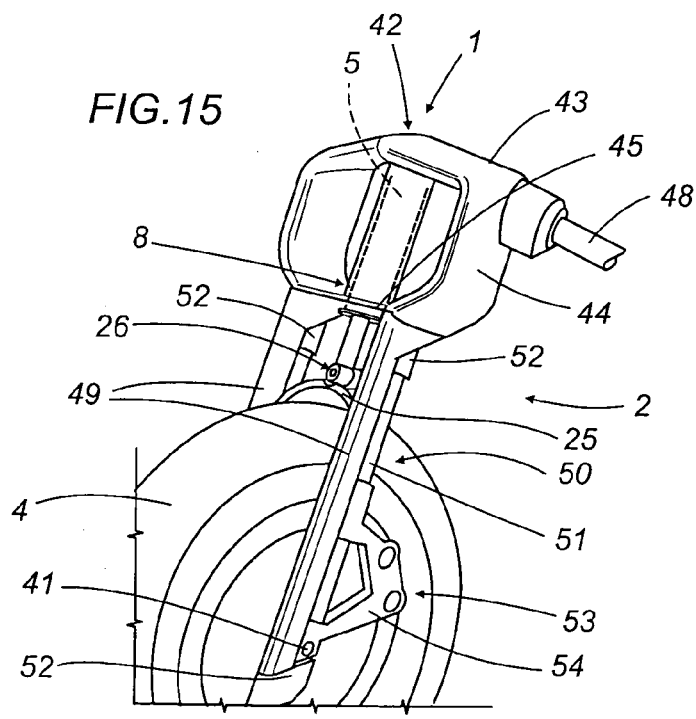

FRONT SUSPENSION FOR A MOTORCYCLE

The present invention relates to a front suspension device for a motorcycle. The invention may, however, also be applied to the rear suspension of a motorcycle if the rear wheel also has a telescopic sliding device.

The front suspension device according to this invention may be applied to all types of motorcycles, scooters and sidecars, as well as to lightweight three- and four-wheel vehicles, known as tricycles and quad bikes.

For convenience, this specification refers to motorcycles but without thereby restricting the scope of the invention to exclude application to other vehicles.

Traditionally, the front suspension of a motorcycle comprises a telescopic fork consisting of a leg that slides telescopically within a tube, these components housing an elastic element (usually a helical spring) and a shock absorber.

This type of configuration has inherent size limitations restricting the choice of spring and shock absorber, which must be small enough to fit inside the fork legs and tubes. Further, since the fork legs and tubes must slide telescopically, they must offer good resistance to longitudinal, transversal and torsional stress with respect to the direction of travel of the motorcycle.

The fork leg and tube assembly must take into account all these requirements, which means it must be large enough to suitably house the spring and shock absorber and to create a sufficiently rigid structure, although this large size is superfluous for the purposes of the telescopic sliding of the motorcycle wheel.

This results in an excessively large size and high number of parts, which in turn means increased weight, higher costs and a more complicated structure.

Changes to this traditional configuration are disclosed in patent application EP-A1-0 245 221 and in patents DE-C-837 508 and FR-A-1 076 590.

Described in these documents is a front suspension for a motorcycle based on a telescopic fork and where, at the front of the headstock there is a spring or a spring-shock absorber assembly acting on the legs or tubes that support the wheel through an arch shaped bracket connected to the legs and tubes themselves.

These solutions have not proved entirely satisfactory, mainly on account of the large amount of space required at the top end of the motorcycle.

This is an especially serious problem for modern motorcycles where space at the top and front ends is occupied to an ever increasing extent by the components of sophisticated fuel systems, large sized air boxes and liquid cooling systems for their engines.

One object of the present invention is to provide a front suspension for a motorcycle offering the same advantages and performance as traditional telescopic fork suspension systems but in a simplified general structure, of reduced weight and lower cost, and offering facilitated maintenance and component substitution procedures.

Another object of the invention is to provide a front suspension for a motorcycle that occupies less space at the upper and front sections of the motorcycle.

In accordance with one aspect of it, the present invention discloses a front suspension a motorcycle as described in the independent claim below.

The dependent claims describe preferred, advantageous embodiments of the invention.

The preferred embodiments of the invention will now be described, without restricting the scope of the inventive concept, with reference to the accompanying drawings in which:

FIGS. 9 and 10 are a perspective front view and a side view of another embodiment of the front motorcycle suspension according to the present invention;

FIG. 11 is a perspective front view of yet another embodiment of the front motorcycle suspension according to the present invention;

FIG. 12 is a cross section of a detail of the embodiments of FIGS. 9–11;

FIGS. 13 and 14 illustrate another embodiment of the front motorcycle suspension according to the present invention; and FIGS. 15 to 19 illustrate yet more embodiments of the front motorcycle suspension according to the present invention.

Figure 1:
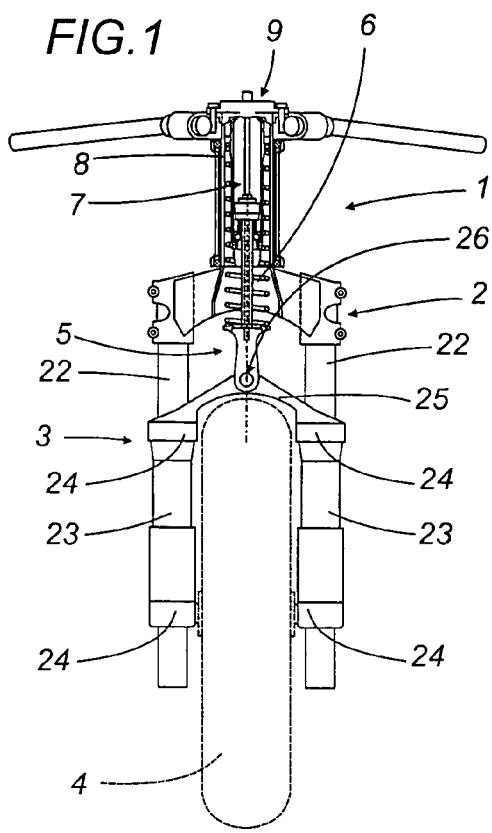
FIG. 1 is a front view, with some parts in cross section, of the front motorcycle suspension according to the present invention.

With reference to the accompanying drawings, the numeral 1 denotes a front suspension for a motorcycle.

The front motorcycle suspension according to the invention essentially comprises a fork 2, a sliding unit 3 that slides on the fork 2 in a substantially vertical direction, the unit 3 in turn supporting the motorcycle wheel 4, and a centrally mounted elastic shock absorbing assembly 5 acting on the sliding unit 3 and being of a type that is easy to remove. More specifically, the elastic shock absorbing assembly 5 consists of a helical spring 6 and a shock absorber 7, these components being at least partly housed in the headstock 8.

The assembly 5 is connected at the bottom to the sliding unit 3 and at the top, through an upper connection 9, to the headstock 8.

Figure 6:
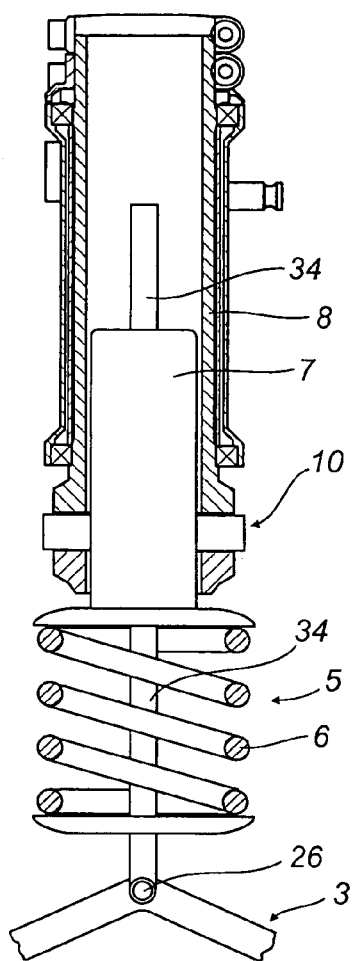

In the embodiment illustrated in FIG. 6, the assembly 5 is connected to the headstock 8 through a side connection 10. Both the top connection 9 and the side connection 10 enable the assembly 5 to be removed quickly and easily, sliding it off directly either from the top or from the bottom of the headstock 8.

Figure 7:
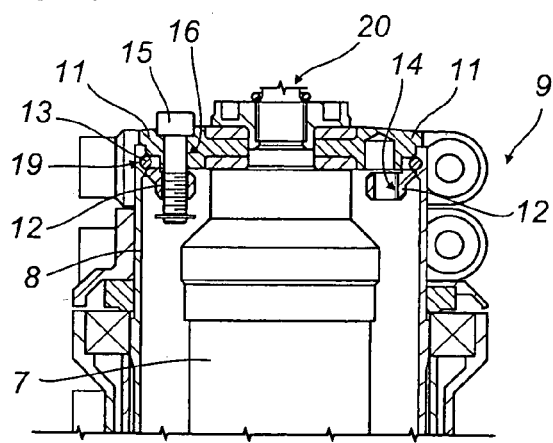
FIGS. 7, 7A and 8 are detail views, partly in cross section, of the front motorcycle suspension shown in FIGS. 1–4.
Figure 8:
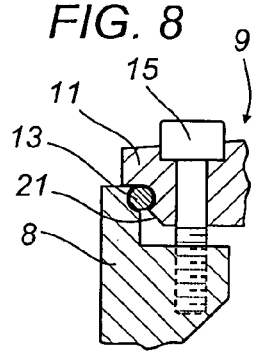
Figure 7A:
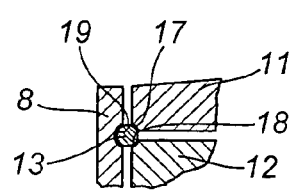
Figure 7B:
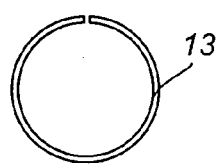
Figure 16:
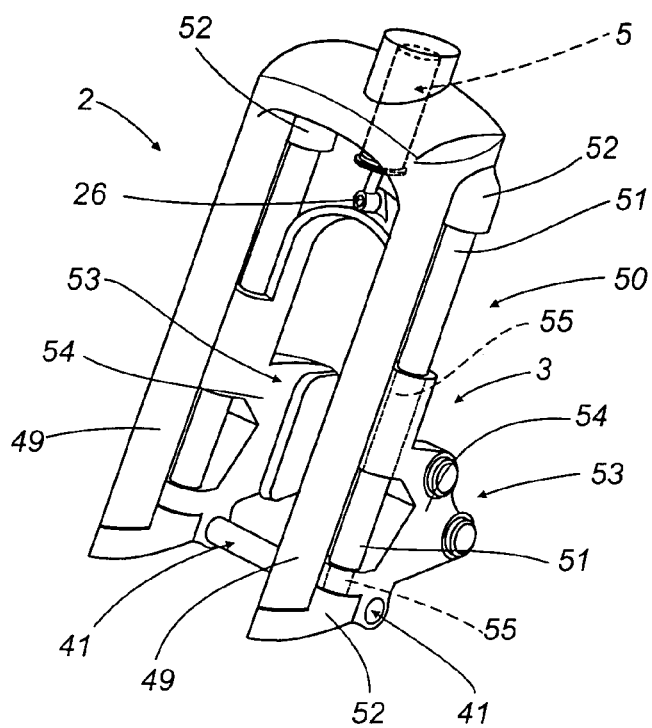
Figure 17:
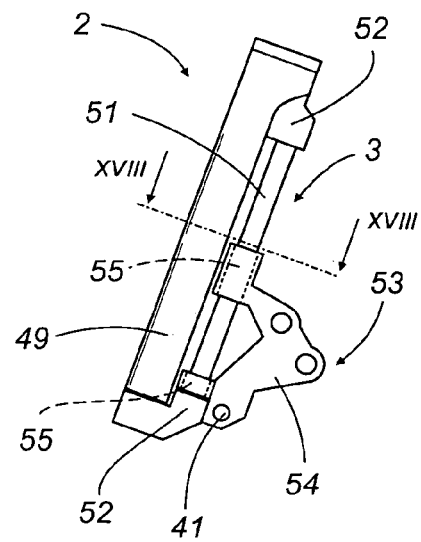

The connection 9 is illustrated in more detail in FIGS. 7, 7A and 8.

In the embodiment illustrated in FIG. 7, the connection 9 comprises an upper plate 11, an annular plate 12 positioned under the upper plate 11 and a split ring 13 (top of FIG. 7).

The annular plate 12 comprises some threaded holes 14 for accommodating some bolts 15—for example three bolts 15 arranged at equal angular intervals of 120 degrees—passing through corresponding unthreaded holes 16 made in the upper plate 11.

The plates 11 and 12 have on their edges two perimetric tapering seats 17, 18 respectively, facing each other and tapering in opposite directions in such a way as to create an annular space that houses the split ring 13 (FIG. 7A). The latter is also housed in a seat 19 made in the headstock 8.

The upper plate 11 also comprises a customary fastener 20 for the shock absorber 5.

When the bolts 15 are tightened, the plates 11 and 12 move closer together and, thanks to the tapering seats 17, 18, cause the split ring 13 to expand and move fixedly into the seat 19 in the headstock 8, thus creating a shape connection between the headstock 8 and the plate 11 and hence the shock absorber 7.

When the bolts 15 are slackened, the plates 11 and 12 move apart and the split ring 13 tends to decrease in diameter until it comes out of the seat 19 of the headstock 8, enabling the plate 11, assembly 5, spring 6 and shock absorber 7 to be quickly removed from above.

FIG. 8 shows an alternative version of the connection 9 where only the upper plate 11 is present and where the bolts 15 are screwed directly into threaded holes 14 in the headstock 8.

In this embodiment, the plate 11 has an undercut 21 whose section partly follows the toroidal profile of the split ring 13.

Whatever the case, the upper plate 11, whether with or without the annular plate 12, and the bolts 15 are designed solely to expand and secure the ring 13 in the respective seats or undercuts, in such a way as to create a shape connection.

The function of mechanical resistance to stress of the assembly 5 is therefore performed by the headstock 8 with the plates 11 and 12 and the split ring 13.

Figure 2:
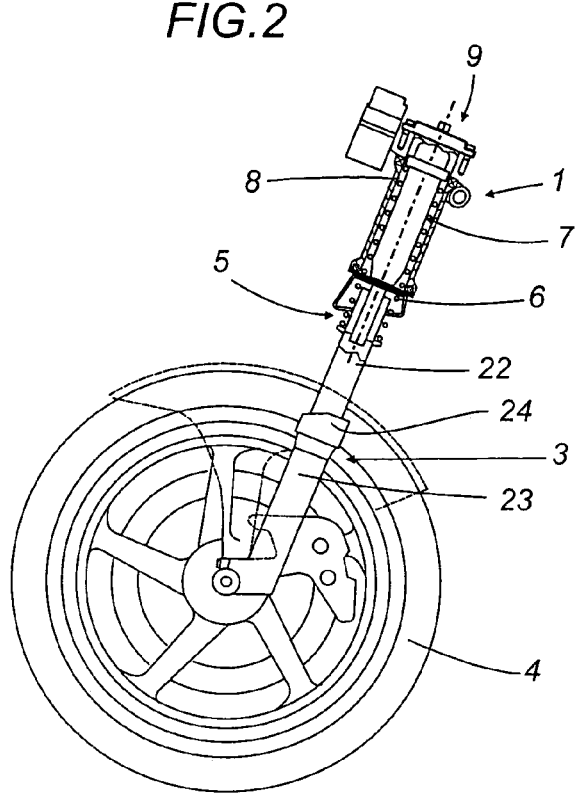
FIG. 2 is a side view, with some parts in cross section, of the front motorcycle suspension of FIG. 1.

In the embodiment illustrated in FIGS. 1 and 2, the fork 2 comprises two legs 22 rigidly fixed in a customary manner to the headstock 8.

The sliding unit 3 is fitted over the legs 22, which are preferably cylindrical in shape. The sliding unit comprises two sleeves 23 also cylindrical in shape and each equipped with two antifriction bushes 24, one at the top and one at the bottom.

The two sleeves 23 are connected to each other by a bracket 25 which is in turn connected to the assembly 5—spring 6 and shock absorber 7—through an articulated joint 26. At the bottom, the sleeves 23 have customary connections for the wheel 4.

Figure 3:
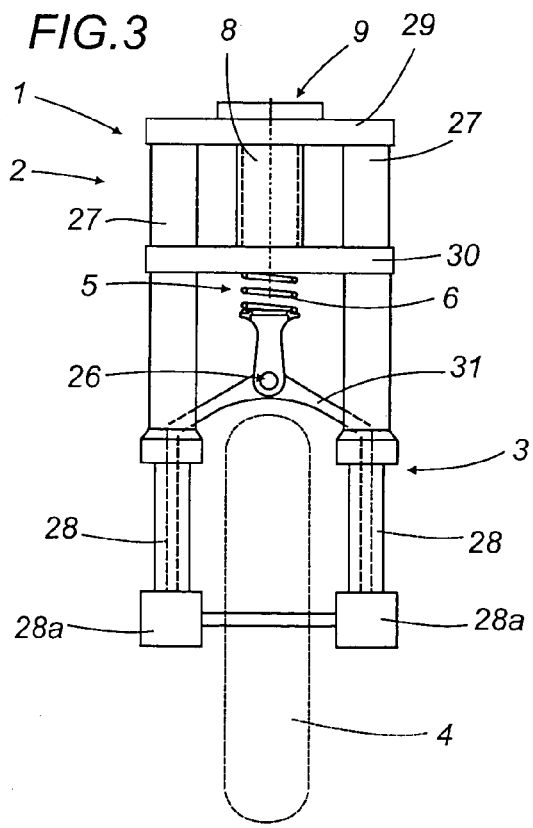
FIG. 3 is a perspective front view of another embodiment of the front motorcycle suspension according to the present invention.
Figure 4:
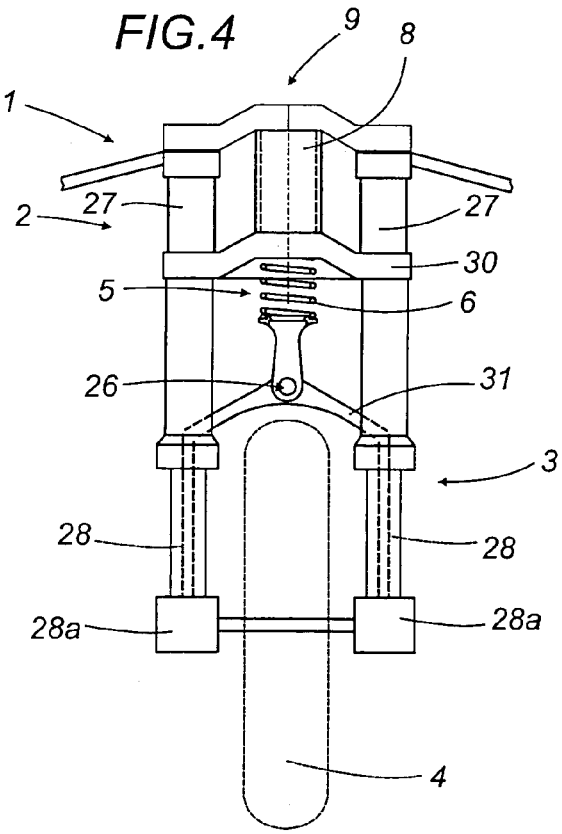
FIG. 4 is a perspective front view of the embodiment of the front motorcycle suspension shown in FIG. 3.

In the embodiment illustrated in FIGS. 3 and 4, the fork 2 comprises two sleeves 27, preferably cylindrical, fixed to the headstock 8 in customary manner through a top yoke 29 and a bottom yoke 30.

The sliding unit 3 is located inside the sleeves 27 and comprises two tubes 28, also cylindrical, which in turn present customary connections 28a for the wheel 4.

As a whole, the fork 2 shown in FIGS. 3 and 4 has the structure known in the jargon of the trade by the term "upside-down fork" structure.

The tubes 28 are connected to each other through an arch-shaped element 31 which is joined at the bottom to the connections 28a for the wheel 4 and, at the top, to the assembly 5 through an articulated joint 26 as in the previous embodiment.

Figure 5:
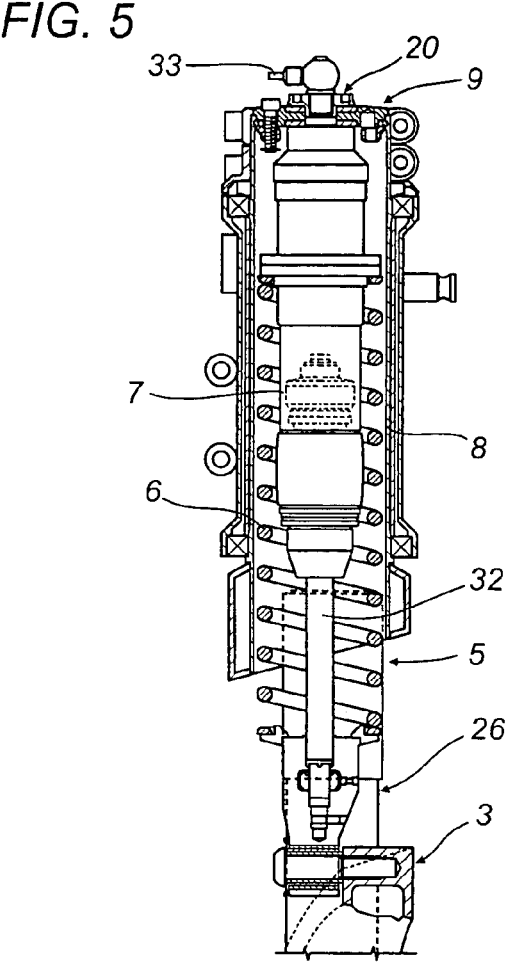
FIGS. 5 and 6 are detail views of other embodiments of the front motorcycle suspension shown in the figures listed above.

FIGS. 5 and 6 illustrate in detail two different embodiments of the elastic shock absorbing assembly 5.

In FIG. 5, the assembly 5 comprises a spring 6 that is partly coaxial with the shock absorber 7. The latter is of customary type, with a shaft 32 that is inserted from the bottom end only, whilst the top end presents a connection 33 for a compensating tank (not illustrated).

The assembly 5 is also at least partly accommodated in the headstock 8 which may be made in a suitable size without excessively encumbering the motorcycle.

Compared to the configuration with traditional forks, the headstock 8 and the motorcycle frame that mounts the fork may be larger in size but without creating problems for the arrangement of the other parts of the motorcycle, namely, air-box, tank, liquid cooling system, and so on.

On the contrary, the increased size of the headstock 8, of the related supports and of the frame makes the motorcycle as a whole more resistant and robust.

Moreover, in the configuration illustrated in FIGS. 1 and 2, the fork does not have the upper tubes, thus occupying considerably less space.

In FIG. 6, the assembly 5 comprises a spring 6 positioned under the shock absorber 7. The latter is of the type known in the jargon of the trade as a "through shaft damper", with a through shaft 34 and a side connection 10. The spring 6, in this case, is a helical spring and, because it is located under the shock absorber, it may be relatively large in diameter and in any case, larger than the inside diameter of the headstock 8.

In the embodiment illustrated in FIGS. 9 to 12, the fork 2 comprises at the bottom of it two lower bars 35 with an approximately elliptic cross section. As illustrated in more detail in FIG. 12, bars 35 with thinner sections having an aerodynamic profile can also be used in order to minimise the motorcycle's air resistance.

The sliding unit 3 comprises a mounting frame 36 that slides on the bars 35 by means of rollers 37. In the embodiment illustrated in FIGS. 9 to 12, there are four rollers 37 on each side.

At the top, the frame 36 has a bracket 38 that is connected to the elastic shock absorbing assembly 5 through an articulated joint 26 as in the other embodiments.

Advantageously, the frame 36 and the bracket 38 may be constructed as one with the mudguard 39 forming a single element designed to guard and structurally support the wheel 4.

In this case, the mudguard 39 must be made from a suitably resistant material: for example, it may be made of carbon fibres.

To facilitate removal of the wheel 4, the lower bars 35 have a slot 40 allowing the pin 41 of the wheel 4 to be removed from the side.

FIG. 9 shows a box-shaped part 42 located at the top of the front suspension 1 and connected, at the bottom, to the bars 35 and, at the sides, to the handgrips 48 of the motorcycle.

The box-shaped part 42 is open at the front and at the back and, on four sides of it, is made up of elements 43, 44, 45, 46, 47 having an aerodynamic cross section in order to reduce the resistance of the air as the motorcycle moves forward. Advantageously, if the motorcycle features hydraulic brake and clutch, the hydraulic pumps for these parts may be built directly into the elements 43, 47, respectively.

FIG. 11, on the other hand, shows a form of handlebars where the handgrips 48 are connected directly to the headstock 8.

The box-shaped part 42 may also be used in the embodiment of FIG. 1, with the legs 22 located at the bottom. An embodiment of this type is illustrated in FIGS. 13 and 14.

Figure 18:
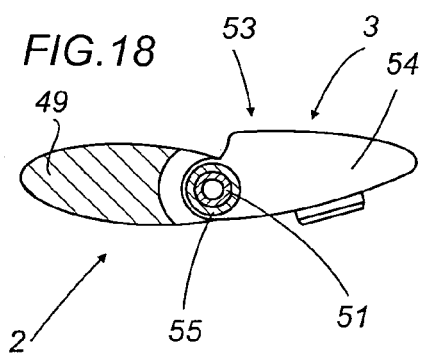
Figure 19:
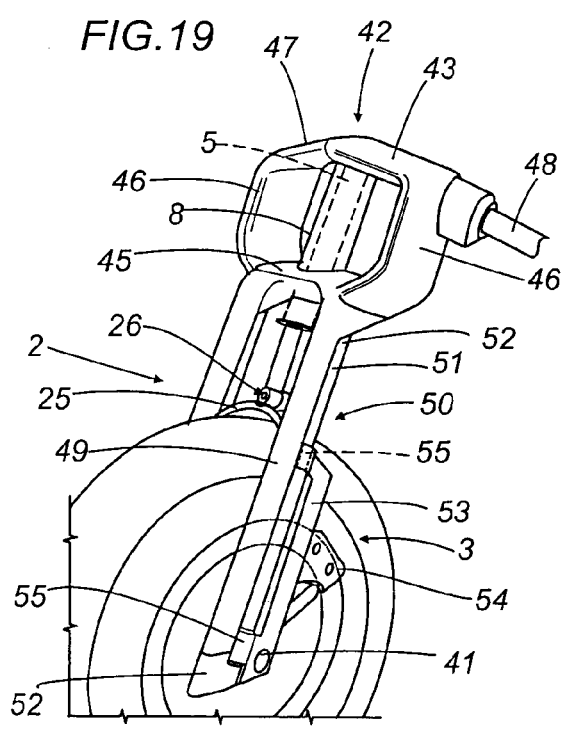

In the embodiment illustrated in FIGS. 15 to 19, the fork 2 comprises at the bottom of it two lower bars 49 with an aerodynamic cross section (FIG. 18).

Each bar 49 has at the back of it a guide element 50 on which the sliding unit 3 can slide.

The guide element 50 is embodied as a tube 51 with a relatively small diameter because the structural function is provided by the bar 49 and because the ends of the tube 51 are connected to the bar 49 by means of strong fixed joints 52.

The sliding unit 3 comprises two sliders 53 equipped with antifriction bushes 55 that slide on the tubes 51.

Looking in more detail, the diameter of the tube 51 is not greater than the cross section of the bar 49.

The two sliders 53 are connected by a bracket 25 which is in turn connected to the elastic shock absorbing assembly 5 through an articulated joint 26 as in the embodiments described above. Advantageously, the sliders 53 are constructed as one with the disk brake callipers 54.

As in all the other embodiments, the handgrips 48 may be fixed to the box shaped part 42 described above (FIGS. 15 and 19) or directly to the headstock 8.

The invention achieves important advantages.

In all its embodiments, the front motorcycle suspension according to the present invention has a smaller number of components, a single elastic shock absorbing element, and components with a simpler structure and less sensitive to tolerances.

Thanks to the smaller number of components and their simpler structure, the motorcycle is much less bulky as a whole and has lighter unsuspended masses.

The principally central position of the parts means that steering the motorcycle is less influenced by inertia.

Production cost is lower because the components can be made even by non-specialised manufacturers.

In the embodiment where the handgrips 48 are connected directly to the headstock 8, the steering angle is wide, without dimensioning problems due to the fork.

In this embodiment, there is also more space in the top front section for the other motorcycle parts (air-box, electrical/electronic equipment, fuel tank, and so on).

The front motorcycle suspension according to the present invention also provides greater longitudinal and torsional strength.

Maintenance and substitution of the hydraulic section is greatly facilitated by the single elastic shock absorbing element having a quick-release connection. Shock absorber seal life is increased because the shock absorber is not subject to deformation.

The invention as described above may be modified and adapted in several ways without thereby departing from the scope of the inventive concept as defined in the claims.

The invention claimed is:

1. A front suspension (1) for a motorcycle with a front wheel (4), comprising:
a fork (2) with a headstock (8), a sliding unit (3) that slides on the fork (2) in a substantially vertical direction, the unit (3) in turn supporting the motorcycle wheel (4), and an elastic shock absorbing assembly (5) acting on the sliding unit (3), the suspension being characterised in that the shock absorbing assembly (5) is centrally mounted within the headstock (8) and is connected to the headstock (8) by a quick-release connection (9, 10) so that the assembly (5) can be easily removed directly from the top or bottom of the headstock (8), wherein the connection (9) comprises an upper plate (11) with a perimetric seat (17) and a split ring (13) housed partly in the perimetric seat (17) under the upper plate (11), in such a way that moving the plate (11) closer to the ring (13) causes the ring (13) to increase in diameter.

2. The front motorcycle suspension (1) according to claim 1, characterised in that the fork (2) comprises two legs (22) connected to the headstock (8) and in that the sliding unit (3) comprises two sleeves (23) that slide over the legs (22).

3. The front motorcycle suspension (1) according to claim 1, characterised in that the sliding unit (3) is connected to the elastic shock absorbing assembly (5) by an articulated joint (26).

4. The front motorcycle suspension (1) according to claim 2, characterised in that the two sleeves (23) are connected by a bracket (25) which is in turn connected to the elastic shock absorbing assembly (5).

5. The front motorcycle suspension (1) according to claim 1, characterised in that it comprises an annular plate (12) with a perimetric seat (18) located under the upper plate (11) and acting in conjunction with the latter; the ring (13) being housed between the perimetric seats (17 and 18) in such a way that when the plates (11 and 12) move closer together, the ring (13) is made to expand.

6. The front motorcycle suspension (1) according to claim 1, characterised in that the headstock (8) comprises a seat (19) into which the split ring (13) is inserted when the latter expands.

7. The front motorcycle suspension (1) according to claim 5, characterised in that the tapering seats (17, 18) are tapered in opposite directions so as to create a space with a smaller diameter to accommodate the split ring (13).

8. The front motorcycle suspension (1) according to claim 1, characterised in that the upper plate (11) is moved closer to the ring (13) by means of a set of bolts (15).

9. The front motorcycle suspension (1) according to claim 8, characterised in that the upper plate (11) comprises holes (16) for the bolts (15) and a fastener (20) for the shock absorber (5).

10. The front motorcycle suspension (1) according to claim 8, characterised in that the upper plate (11) is moved closer to the ring (13) by means of a set of bolts (15) inserted into corresponding threaded holes (14) made in the headstock (8) or in the annular plate (12).

* * * * *